US005357791A

United States Patent [19]

Gee et al.

[11] Patent Number: 5,357,791

[45] Date of Patent: Oct. 25, 1994

[54] OBD-II EXHAUST GAS OXYGEN SENSOR

[75] Inventors: Thomas S. Gee, Canton; Thomas A. Schubert, Novi; Paul F. Smith, Dearborn Heights; Carl W. Squire, Taylor, all of Mich.

[73] Assignee: Ford Motor Company, Dearborn, Mich.

[21] Appl. No.: 31,407

[22] Filed: Mar. 15, 1993

[51] Int. Cl.[5] .......... G01M 15/00

[52] U.S. Cl. .......... 73/118.1

[58] Field of Search .......... 73/118.1, 23.31, 117.2; 364/431.05, 431.11; 123/688

[56] References Cited

U.S. PATENT DOCUMENTS

| | | | |
|---|---|---|---|
| 4,928,518 | 5/1990 | Tamura | 73/23.31 |
| 4,980,834 | 12/1990 | Ikeda et al. | 364/431.05 |
| 5,080,072 | 1/1992 | Husokai et al. | 123/688 |
| 5,097,700 | 3/1992 | Nakane | 73/118.1 |
| 5,154,054 | 10/1992 | Nakane et al. | 60/276 |
| 5,179,924 | 1/1993 | Manaka | 123/688 |
| 5,212,947 | 5/1993 | Fujimoto et al. | 73/118.1 |

*Primary Examiner*—Robert Raevis
*Attorney, Agent, or Firm*—Peter Abolins; Roger L. May

[57] ABSTRACT

Functionality of the exhaust gas oxygen sensor is determined by continually monitoring the exhaust gas oxygen sensor voltage to determine both a peak rich voltage and peak lean voltage. Based on the information after some predetermined time period, a system determines whether rich air/fuel ratio excursions are required and lean air/fuel ratio excursions are required. If a rich air/fuel excursion is required, then there is a command to decrease the air/fuel ratio to make it rich until the peak rich voltage is greater than a predetermined threshold voltage. Analogously, if a lean excursion is required, then there is a command to have a lean air/fuel ratio excursion done until the peak lean voltage is less than a predetermined threshold. If a time out happened before the peak rich voltage was greater than the rich threshold or the peak lean voltage was less than the lean threshold, then there is a determination that there is a malfunction detected on the sensor/circuit.

3 Claims, 2 Drawing Sheets

OBD-II EXHAUST GAS OXYGEN SENSOR

BACKGROUND OF THE INVENTION

1. Field of the invention

This invention relates to onboard monitoring of emission control components in an automobile vehicle having an internal combustion engine.

2. Prior Art

It is known to use catalysts in the exhaust stream of an automobile in order to reduce undesired components of the exhaust. It is also known to monitor whether the catalyst is operating properly. One way of doing this is to have exhaust gas oxygen sensors both upstream and downstream of the catalyst. The output signals from these two sensors are compared to make a determination about the operation of the catalyst located between the two exhaust gas oxygen (EGO) sensors. However, such a method assumes proper operation of the EGO sensors.

It is known that the EGO sensor can be removed from the vehicle and tested in a laboratory to determine proper operation. However, this is not a practical method, and it would be desirable to have a method whereby the EGO sensor can be tested while still installed on the vehicle. These are some of the problems this invention overcomes.

SUMMARY OF THE INVENTION

This invention teaches a non-intrusive approach to determining the functionality of an EGO sensor located down stream of the catalyst, which is also known as a catalyst monitor sensor (CMS). In accordance with an embodiment of this invention, the functionality of the CMS can be determined in a non-intrusive way. Further, for a new catalyst with very high oxygen storage capacity, i.e. a green catalyst, this invention provides a method including additional steps of intrusive monitoring of the CMS.

In particular, in accordance with an embodiment of this invention it is possible to provide a measure of the functionality of the CMS without affecting a vehicle emission test or producing an unwanted indication of malfunction during green catalyst operation.

Functionality of the exhaust gas oxygen sensor is determined by continually monitoring the exhaust gas oxygen sensor voltage to determine both a peak rich voltage and peak lean voltage. The system also determines whether rich air/fuel ratio excursions are required and/or lean air/fuel ratio excursions are required based on the peak rich/lean voltages recorded over a predetermined period of time. If a rich air/fuel excursion is required then there is a command to decrease the air/fuel ratio to make it rich until the peak rich voltage of the CMS is greater than a predetermined threshold voltage. Analogously, if a lean excursion is required then there is a command to have a lean air/fuel ratio excursion until the peak lean voltage of the CMS is less than a predetermined threshold voltage. If a time out (passage of a predetermined time period) happened before the peak rich voltage was greater than the rich threshold or the peak lean voltage was less than the lean threshold then there is a determination that there is a malfunction detected on the sensor circuit.

DETAILED DESCRIPTION OF THE INVENTION

Under some operating conditions, it may be desirable to monitor the response rate and/or output voltage of the CMS for malfunction at least once per vehicle trip. Since vehicle emission measurements may be taken during such a trip, it is important that the CMS monitor does not adversely impact the emissions.

In accordance with an embodiment of this invention, the CMS's voltage output is constantly monitored. An extreme value detection algorithm is used to record peak rich and lean values (see FIG. 1). The peak values are later compared to predetermined voltage levels defining a predetermined voltage window. For proper operation, the peak voltage values should be outside the voltage window. This technique depends on an active CMS. During warm-up, acceleration, and deceleration, the CMS is relatively active and acceptable peak values will typically be recorded signifying a functioning CMS.

The only time the CMS would not be active is during a warm start on a green catalyst or with a failed sensor/-circuit. To test the CMS under these conditions the following intrusive algorithm is used. If the proper peak rich or lean values are not recorded in a prescribed period of time (by the end of the Upstream EGO Monitor Test), the fuel control system is forced to operate open-loop rich or lean of stoichiometry (depending on which peak value has not yet been satisfied) until the CMS registers a proper value within a predetermined voltage window, or a calibratable time period elapses (see FIG. 2). Advantageously, this intrusive logic is only used in association with warm starts for the first few hundred miles of a new catalyst or with a failed sensor/circuit.

Figure 1:
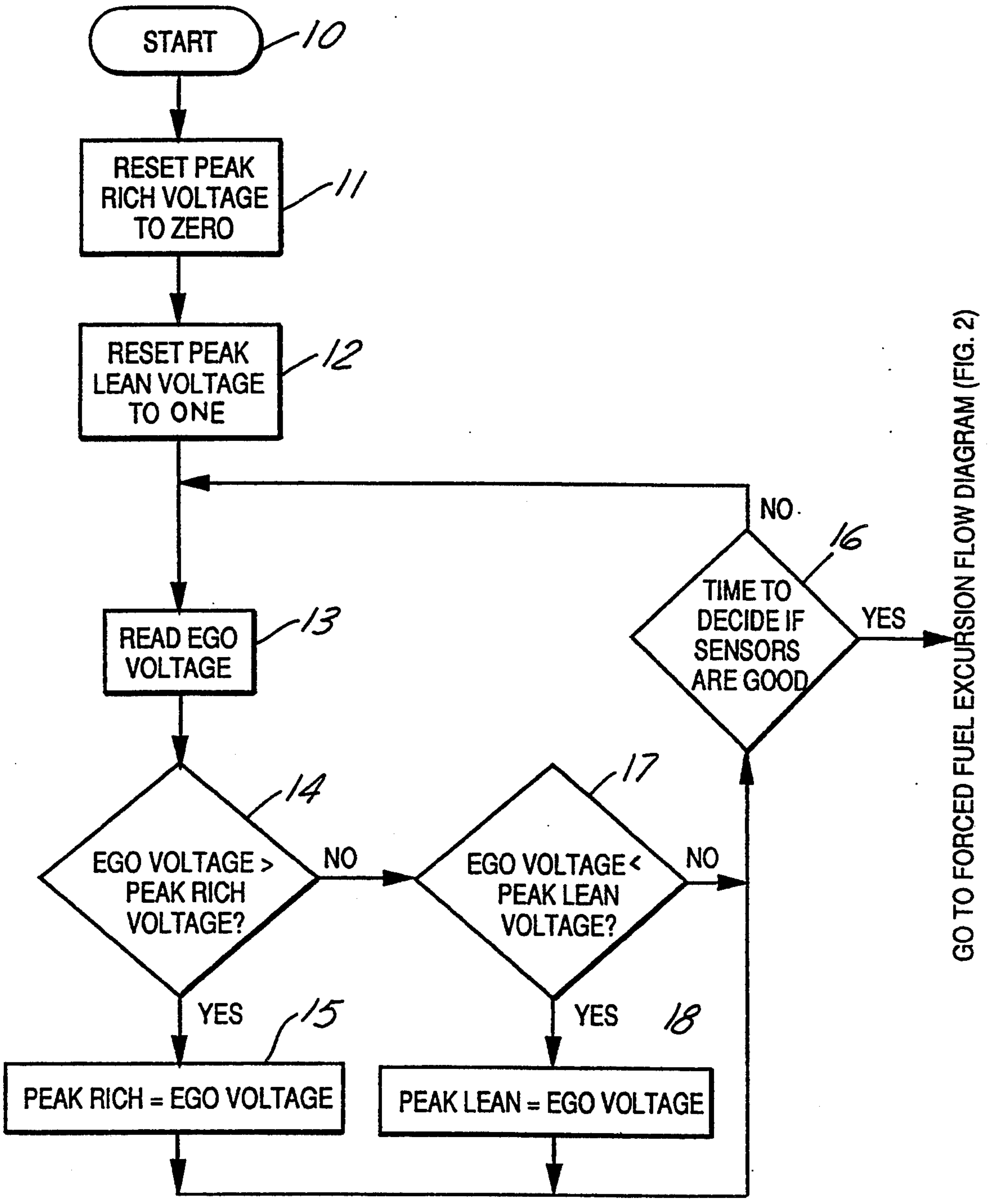
FIG. 1 is a logic flow diagram showing nonintrusive, continual updating of the peak rich and peak lean voltages for the exhaust gas oxygen sensor in accordance with an embodiment of this invention.

Referring to FIG. 1, a value detection process sequence starts at step 10 and continues on to step 11 wherein there is a reset of the peak rich voltage to zero. Logic flow then goes to a step 12 wherein there is a reset of the peak lean voltage to one. Logic flow then goes to step 13 wherein the exhaust gas oxygen sensor voltage is read and then to a decision block 14 wherein it is asked if the exhaust gas oxygen voltage is greater than the peak rich voltage. If yes, logic flow goes to a step 15 wherein the peak rich voltage is set equal to the exhaust gas oxygen sensor voltage. Then logic flow goes to step 16 where it is asked if a decision on the health of the CMS is required. If no, logic returns to step 13. If the result of step 14 is no, logic flow goes to decision block 17 wherein it is asked if the exhaust gas oxygen voltage is less than the peak lean voltage. If the result is no, logic flow goes back to step 16. If the answer is yes, logic flow goes to a step 18 wherein the peak lean voltage is set equal to the exhaust gas oxygen voltage. Logic flow then goes back to step 16.

Step 16 provides the function of adding a predetermined time delay between the steps of comparing the peak voltages of the upstream sensor to the predetermined voltage window and comparing the peak voltage of the downstream sensor to the predetermined voltage window. Further, the combination of steps 12, 13, 14, 17, 21, 23, 27 and 29 provide for comparing the peak voltages of the upstream sensor to a predetermined window and then comparing the peak voltage of the downstream sensor to the predetermined window.

Figure 2:
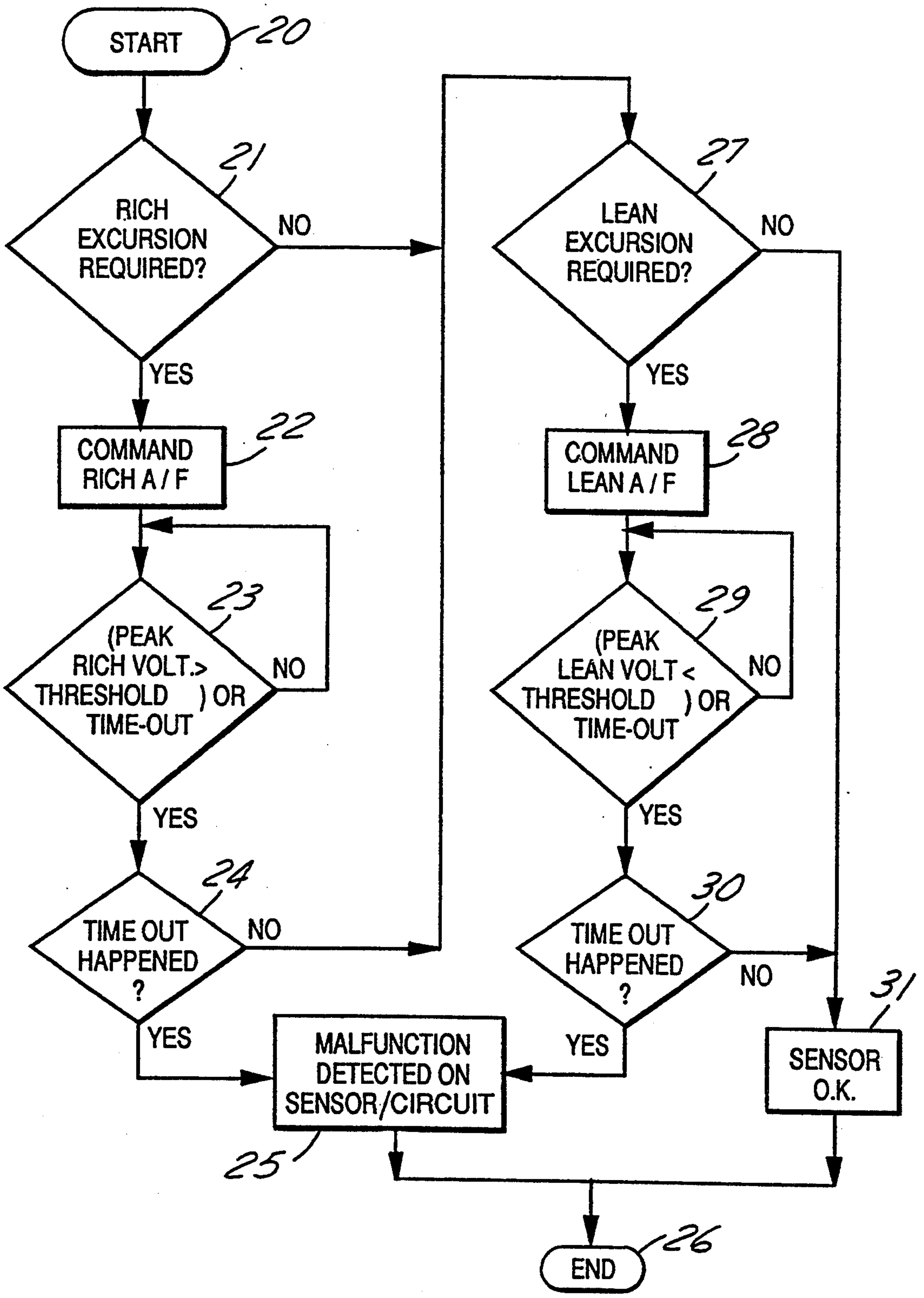
FIG. 2 is a logic flow diagram of an additional intrusive test sequence for testing the exhaust gas oxygen sensor .located down stream of the catalyst in accordance with an embodiment of this invention.

Referring to FIG. 2, logic flow starts at a step 20 and goes to a decision block 21 wherein it is asked if a rich excursion is required (i.e., is peak rich voltage less than the rich voltage threshold). If the answer is yes, logic flow goes to a step 22 wherein there is a commanded rich air/fuel ratio and then to a decision block 23 wherein it is asked if the peak rich voltage is greater than the peak rich voltage threshold or if there is a time out. If the answer is no, logic flow goes back to the input of decision block 23. If the answer is yes, logic flow goes to a decision block 24 wherein it is asked if the time out happened. If the answer is yes, logic flow goes to a step 25 wherein the malfunction is detected on the sensor/circuit and to a step 26 which ends the algorithm.

If at block 24 a time out has not happened, logic flow goes to a decision block 27 wherein it is asked if there is a lean excursion required (peak lean voltage is greater than the peak lean voltage threshold). Decision block 27 also receives an input from the NO output of decision block 21 asking if the rich excursion is required. If the output of decision block 27 is a no, logic flow goes to a step 31 which says the sensor is OK. If the output of decision block 27 is yes, logic flow goes to a step 28 wherein there is commanded a lean air/fuel ratio. Logic flow then goes to a decision block 29 wherein the question is asked if the peak lean voltage is less than the peak lean voltage threshold or a time out? If the decision is no, logic flow returns to the input of decision block 29. If the decision is yes, logic flow goes to a decision block 30 wherein it is asked if the time out happened. If the time out did not happen, logic flow goes to step 31 which is the sensor OK. If the time out happened, logic flow goes to a step 25 discussed before.

In summary, a method in accordance with an embodiment of this invention records peak rich and lean values of the CMS under varying conditions and then evaluates the peak values for proper voltage levels. Various modifications and variations will no doubt occur to those skilled in the art to which this invention pertains. Alternatively, the lean voltage may be evaluated first, and the rich voltage second, reversing the order of FIG. 2.

What is claimed:

1. A method for determining the functionality of an EGO sensor including the non-intrusive steps of:

reading the exhaust gas oxygen sensor voltage;

comparing the exhaust gas oxygen sensor voltage to a peak rich voltage;

comparing the exhaust gas oxygen voltage to a peak lean voltage;

storing the exhaust gas oxygen sensor voltage as the peak rich voltage if the current exhaust gas oxygen voltage is greater than the previous peak voltage;

storing the exhaust gas oxygen sensor voltage as the peak lean voltage if the exhaust gas oxygen sensor voltage is less than the peak lean voltage; and further including the intrusive steps of:

determining if a rich air/fuel ratio excursion is required;

commanding a rich air/fuel ratio excursion if it is required;

holding the rich air fuel ratio until there is a time out or the peak rich voltage is greater than a threshold rich voltage;

if a time out happened, determining that there is a malfunction of the sensor;

determining if a lean excursion is required;

if yes, commanding a lean air/fuel ratio excursion;

holding the lean A/F excursion until the peak lean voltage is less than a threshold lean voltage or there has been a time out;

if there is a time out, then a malfunction is detected;

if no time out happened, then the sensor is OK; and if no lean excursion is required, then the sensor is OK.

2. A method for determining the functionality of an upstream or a downstream EGO sensor associated with the exhaust of an internal combustion engine including the steps of:

reading the voltage from each of the exhaust gas oxygen sensors, storing the peak voltage readings of the exhaust gas sensor voltages;

comparing a peak voltage reading to a predetermined voltage window by comparing the peak voltages of the upstream sensor to a predetermined window and then comparing the peak voltages of the downstream sensor to the predetermined window; and adding a predetermined time delay between the steps of comparing the peak voltages of the upstream sensor to the predetermined voltage window and comparing the peak voltage of the downstream sensor to the predetermined voltage window.

3. A method as recited in claim 2 further comprising the intrusive steps of:

determining if a rich air/fuel ratio excursion is required;

commanding a rich air/fuel ratio excursion if it is required;

holding the rich air/fuel ratio until there is a time out or the peak rich voltage is greater than the threshold rich voltage;

if a time out happened, determining that there is a malfunction of the sensor;

determining if a lean excursion is required; if yes, commanding a lean air/fuel ratio excursion;

holding the lean A/F excursion until the peak lean voltage is less than the threshold lean voltage or there has been a time out;

if there is a time out, then a malfunction is detected;

if no time out happened, then the sensor is OK; and if no lean excursion is required, then the sensor is OK.

* * * * *